(12) United States Patent
Arend et al.

(10) Patent No.: US 11,548,355 B2
(45) Date of Patent: Jan. 10, 2023

(54) VEHICLE DOOR

(71) Applicant: GEBR. BODE GMBH & CO. KG, Kassel (DE)

(72) Inventors: Ulrich Arend, Homburg (DE); Lars Linnenkohl, Staufenberg (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 681 days.

(21) Appl. No.: 16/086,243

(22) PCT Filed: Feb. 14, 2017

(86) PCT No.: PCT/EP2017/053228
§ 371 (c)(1),
(2) Date: Jun. 15, 2020

(87) PCT Pub. No.: WO2017/157598
PCT Pub. Date: Sep. 21, 2017

(65) Prior Publication Data
US 2021/0138878 A1    May 13, 2021

(30) Foreign Application Priority Data

Mar. 18, 2016 (DE) ................ 20 2016 001 777.3

(51) Int. Cl.
*B60J 1/00* (2006.01)
*B60J 1/10* (2006.01)
*B60J 5/04* (2006.01)

(52) U.S. Cl.
CPC .............. *B60J 1/007* (2013.01); *B60J 1/10* (2013.01); *B60J 5/0487* (2013.01); *B60J 5/0497* (2013.01)

(58) Field of Classification Search
CPC ..... B60J 1/007; B60J 1/10; B60J 5/049; B60J 5/0406; B60J 5/0487; B60J 5/0497
(Continued)

(56) References Cited

U.S. PATENT DOCUMENTS 1,774,020 A * 8/1930 Ledwinka .............. B60J 5/0488
49/378
2,422,447 A * 6/1947 Trautvetter ............ B60J 5/0483
160/229.1
(Continued)

FOREIGN PATENT DOCUMENTS

DE   10053678 A1 * 5/2002 ............. B60J 1/006
EP    0304694 A2 * 3/1989 ............. B60J 1/006
(Continued)

OTHER PUBLICATIONS

International Search Report dated May 19, 2017 re: Application No. PCT/EP2017/053228, pp. 1-3, citing: EP 0 304 694 A2, US 2007/056231 A1, JP S57 199121 U, U.S. Pat. No. 4,364,209 A.

*Primary Examiner* — D Glenn Dayoan
*Assistant Examiner* — Kevin P Weldon
(74) *Attorney, Agent, or Firm* — Cantor Colburn LLP

(57) ABSTRACT

A vehicle door, in particular a passenger door for a public transport vehicle, includes a window frame for receiving a window, which has at least one frame element for receiving a respective window edge of the window. The vehicle further includes a door frame for receiving the window frame. The door frame includes a door profile and the at least one frame element includes a window profile respectively, wherein the at least one window profile with reference to a movement in a release direction perpendicular to the window edge received by the respective frame element is engaged with a respective door profile in a form-fitting manner.

11 Claims, 3 Drawing Sheets

(58) Field of Classification Search
USPC .............................................. 296/201, 146.2
See application file for complete search history.

(56) References Cited

U.S. PATENT DOCUMENTS

| | | | |
|---|---|---|---|
| 4,364,209 A | 12/1982 | Gebhard | |
| 2007/0056231 A1 | 3/2007 | Dimario et al. | |
| 2007/0063539 A1* | 3/2007 | DiMario | B60J 1/006 |
| | | | 248/216.4 |
| 2012/0204589 A1* | 8/2012 | Krellner | B60J 5/0487 |
| | | | 62/239 |
| 2020/0047594 A1* | 2/2020 | Gulledge | B60J 5/0487 |

FOREIGN PATENT DOCUMENTS

| | | | | |
|---|---|---|---|---|
| EP | 0304694 A2 | | 3/1989 | |
| EP | 0432590 A1 * | | 6/1991 | B60J 10/79 |
| JP | S57199121 U | | 12/1982 | |
| WO | WO-2006069558 A2 * | | 7/2006 | B60J 5/0463 |
| WO | WO-2015166273 A1 * | | 11/2015 | B60J 1/006 |

* cited by examiner

VEHICLE DOOR

TECHNICAL FIELD

The disclosure relates to a vehicle door and, in particular, a passenger door for a public transport vehicle with a window frame for receiving a window.

BACKGROUND

Conventional vehicle doors are generally found on vehicles and especially on public transport vehicles, such as trams, metros, regional trains, etc. Passenger doors are provided for public transport vehicle s. In particular, it has to do with vehicle doors, which make it possible for passengers to enter and exit the vehicle. Such vehicle doors generally comprise a window frame for receiving a window for the vehicle door in addition to a door frame, which is primarily made of metal and forms the support construction of the vehicle door, and a window frame for receiving a window for the vehicle door. In addition, such a vehicle door also regularly comprises door plates for extensively covering the door frame.

Conventional window frames are welded initially and formed separately from the door frame for the purpose of fastening them to the door frame.

A disadvantage to this approach entails such a welding process being relatively work-intensive and therefore expensive. A subsequent detachment of the fastening, for example, for repair or the like is cumbersome. Based on the most recent prior art, as a consequence, the disclosure provides a vehicle door that is simpler and less expensive to manufacture.

SUMMARY

With reference to a vehicle door having a window frame for receiving a window, this task is achieved by providing a window frame with at least one frame element for receiving a respective window edge of the window, and with a door frame for receiving the window frame, wherein the door frame includes a door profile and wherein the window frame element includes a window profile, wherein the at least one window profile with reference to a movement in a release direction perpendicular to the window edge received by the respective frame element is engaged with a respective door profile in a form-fitting manner.

The vehicle door according to what has been proposed, where, in particular, it can have to do with a passenger door for a public transport vehicle, comprises a window frame for receiving a window, wherein the window, wherein the window frame comprises at least one frame element for receiving a respective window edge of the window. The window edges form the boundary of the level window. The vehicle door according to what has been proposed also comprises a door frame for receiving the window frame, wherein the door frame comprises at least one door profile and wherein the at least one frame element comprises a window profile respectively. With the term "profile", in general, and, in particular, with the terms "door profile" and "window profile", here, and in the following, a respective construction element or a part of the construction with a longitudinal extension is intended, wherein the cross-section of the profile is identical along the longitudinal extension, at least in sections. To the extent door frame surrounds the window frame on a level of the window—the window level—the door frame comprises a door profile pointing inwardly and the window frame comprises a window profile pointing outwardly.

The vehicle door according to what has been proposed is characterized in that the at least one window profile with reference to a movement in a release direction perpendicular to the window edge received by the respective frame element is engaged with a respective door profile in a form-fitting manner. In accordance with what has been proposed, at least one door profile is engaged with a corresponding window profile of the at least one frame element in a form-fitting manner. Preferably, the number of frame elements corresponds to the number of door profiles so that the window profile of each frame element is engaged with a corresponding door profile of the door frame.

The above release direction is on the level, on which the window extends. This level corresponds to the above window level. Furthermore, this release direction extends perpendicular to the window edge intended to be line-like. The special orientation of the release direction thereby continues to correspond to the direction which leads the window profile away from the door profile so that a movement of the frame element into the release direction would result in a detachment of the door frame. As a consequence, an assigned release direction results for each special engagement between a window profile and a door profile. The form-fitting engagement of the window profile with the door profile is in the way of such a movement in the release direction according to that which is been proposed, principally due to this form fit. The form-fitting engagement here particularly refers to the engagement between the window profile and the door profile and not to the respective form fit with other elements, such as fastening elements for example.

In contrast to the approach from the most recent prior art, according to the proposal, it is neither the substance-to-substance connection that hinders a detachment of the frame element from the door frame nor a fastening element separate from the window profile and door profile, such as a screw. Such a substance-to-substance connection in terms of the proposal can be established without processing as it is necessary for an adhesive bond for example. In addition to the form-fitting engagement in the release direction, a form fit can also exist for movements in several or all other directions between the window profile and the door profile.

A preferred embodiment of the vehicle door according to the proposal is characterized in that the form-fitting engagement between the at least one window profile and the respective door profile forms a snap connection. Such a snap connection can be established in a particularly easy manner, for example, by merging the at least one window profile and the respective door profile, which corresponds to merging the frame element with the door frame. At least the window profile or the door profile elastically deforms in the case of such a snap connection and then hooks into the respective other connection partner so that the elasticity of the window profile and/or the door profile is taken advantage of to establish the form-fitting engagement. Furthermore, it may be that the form-fitting engagement between the at least one window profile on the respective door profile forms an non-detachable snap connection. That means that a force acting on the window profile in the release direction does not cause any such elastic deformation of the door profile, which could eliminate the form fit. Furthermore, it is preferred that the form-fitting engagement between the at least one window profile and the respective door profile is a forced form-fitting engagement. A non-positive connection also exists in addition to the form fit.

Another preferred embodiment of the vehicle door according to the proposal is characterized in that the at least one door profile comprises elastic snap hooks to grip behind the projections of the respective window profile when establishing the form-fitting engagement. It is preferred that the snap hooks spring toward each other. That means that the snap hooks draw nearer due to their elastic deflection. As an alternative to this, it may also be that the at least one window profile comprises elastic snap hooks to grip behind projections of the respective door profile when establishing the form-fitting engagement. In the case of this variant as well where the assignment of snap hooks and projections to a window and door profile is reversed, the snap hooks preferably spring toward each other. It may also be that both the window profile as well as the door profile comprise structures, which can both be understood as snap hooks as well as projections in the present context. In such a case, the very same structure can also form a snap hook and a projection, which then also applies to the corresponding counter-structure.

In accordance with a preferred embodiment of the vehicle door according to the proposal, it is provided that the projections of the at least one window profile are set up for elastic deflection when gripping behind these projections by means of the respective snap hooks. Here, it may be that the projections spring away from each other. That means that the projections increase in distance away from each other by means of elastic deflection. An alternative to this preferred embodiment provides that the projections of the at least one door profile are set up for elastic deflection when gripping behind these projections by means of the respective snap hooks. In contrast, this represents a reversal as described in the above where it is also preferred that the projections spring away from each other.

A preferred embodiment of the vehicle door according to the proposal is characterized in that the projections and the snap hooks spring back primarily into a respective rest position after establishing the form-fitting engagement.

A further preferred embodiment of the vehicle door according to the proposal is characterized in that the snap hooks each comprise a contact surface and the projections each comprise an end-stop that is primarily coplanar to the contact surface so that the contact surface abuts the respective end-stop by means of the engagement between the window profile and the door profile. The end-stop is coplanar to the contact surface in this sense so that both do not intersect through the plane defined by the respective surfaces, thereby being analogous to parallelism in the case of straight lines. The above one respective contact surface preferably points in the release direction, wherein this direction is defined by the normal on the contact surface. In this way, joining the frame elements with the door frame can be achieved without significant risk of damaging the joining components. Also here, the very same structure can be equally understood as a contact surface as well as an end-stop in the present context.

In accordance with a preferred embodiment of the vehicle door according to the proposal, it is provided that the at last one frame element primarily extends across an entire edge length of the respectively received window edge. Furthermore, it can be that the window profile of the at least one frame element extends at least across half of the edge length of the respectively received window edge. This allows for a window frame that is closed and circumferential to the furthest extent possible.

A preferred embodiment of the vehicle door according the proposal is characterized in that the at least one door profile extends at least across half of the edge length of the same window edge, which is received by the respective frame element, the window profile of which is engaged with at least one door profile.

Another preferred embodiment of the vehicle door according to the proposal is characterized in that the door frame comprises a door frame body to support the window frame of the vehicle, which is designed as a single piece with a respective door profile. Thereby, the door frame body itself can be made of a multiple of parts, as is described further below. The preferred embodiment has the advantage that the profile for the form-fitting engagement already corresponds to the element, which has a carrying or supporting function in contrast to the window frame, and thereby, also the window. A preferred further development provides that the door frame body comprises an outer profile which is designed to be a single piece with it, which is arranged opposite to the door profile and corresponds to the window profile. In this way, on the door frame body, a connection to its outer circumference can also be established, which primarily corresponds to the connection between the door frame and the window frame.

In accordance with a preferred embodiment of the vehicle door according to the proposal, it is provided that the door frame body comprises three body elements each with a door profile to close the window frame on three sides. The respective door profile is preferably designed as a single piece with the body element. Thereby, in particular, it can be that the body elements are primarily arranged on a frame level and that adjacent body elements are arranged at an angle to one another of primarily 90°. Thereby, this frame level may correspond to the above window level. In this context, body elements are deemed adjacent if their smallest distance away from each other is less than the smallest respective distance to other body elements.

A preferred embodiment of the vehicle door according to the proposal is characterized in that the body elements are each designed separately and adjacent body elements are connected to each other by separate fastening means and/or by a respective adhesive bond. Here, in particular, rivets and screws come into consideration as a fastening means. An adhesive bond in the present context can be established by a weld or a glue connection.

As an alternative to the above single-piece design of the door profile with the door frame body, it is preferably provided that the door frame comprises a door frame body to support the window frame on the vehicle as well as a profile element, which is separate from the door frame body, that the profile element comprises the at least one door profile and is designed as a single piece with this, that the profile element comprises at least one outer profile corresponding to the window profile and the door frame body comprises an inner profile corresponding to the door profile and that the inner profile is engaged with the outer profile in a form-fitting manner. In other words, a separate profile element is arranged between the door frame element and the window frame element. Such profile elements can then also be arranged between the door frame body and the window frame in larger quantities so that, based on the same type of connection, an adjustment between the size of the window frame and the size of the door frame body can be performed.

Another preferred embodiment of the vehicle door according to the proposal is characterized in that the door frame comprises at least three frame elements so that at least three window edges of the window are received by one frame element respectively. With reference to this, a preferred embodiment provides that the frame elements are primarily arranged on the frame level and that adjacent frame elements are arranged at an angle to each other of primarily 90°.

It is preferred if the frame elements are primarily made of metal. In addition or as an alternative, the door frame and, in particular, the door frame body 13 can primarily be made of metal. Thereby, alloys are not taken into consideration. It is furthermore preferred that the metal comprises aluminium.

Furthermore, a preferred embodiment of the vehicle door according to the proposal provides that the vehicle door comprises at least one door plate to fasten to the door frame so that the at least one door plate attached to the door frame primarily fully covers the door frame and the window frame and, preferably, a respective window opening of the at least one door plate fully leaves a window received by the window frame uncovered.

BRIEF DESCRIPTION OF THE DRAWINGS

Other details, features, and advantages of the present disclosure are explained in the following based on the drawing of a preferred exemplary embodiment. The drawings show.

DETAILED DESCRIPTION OF THE DRAWINGS

Figure 1:
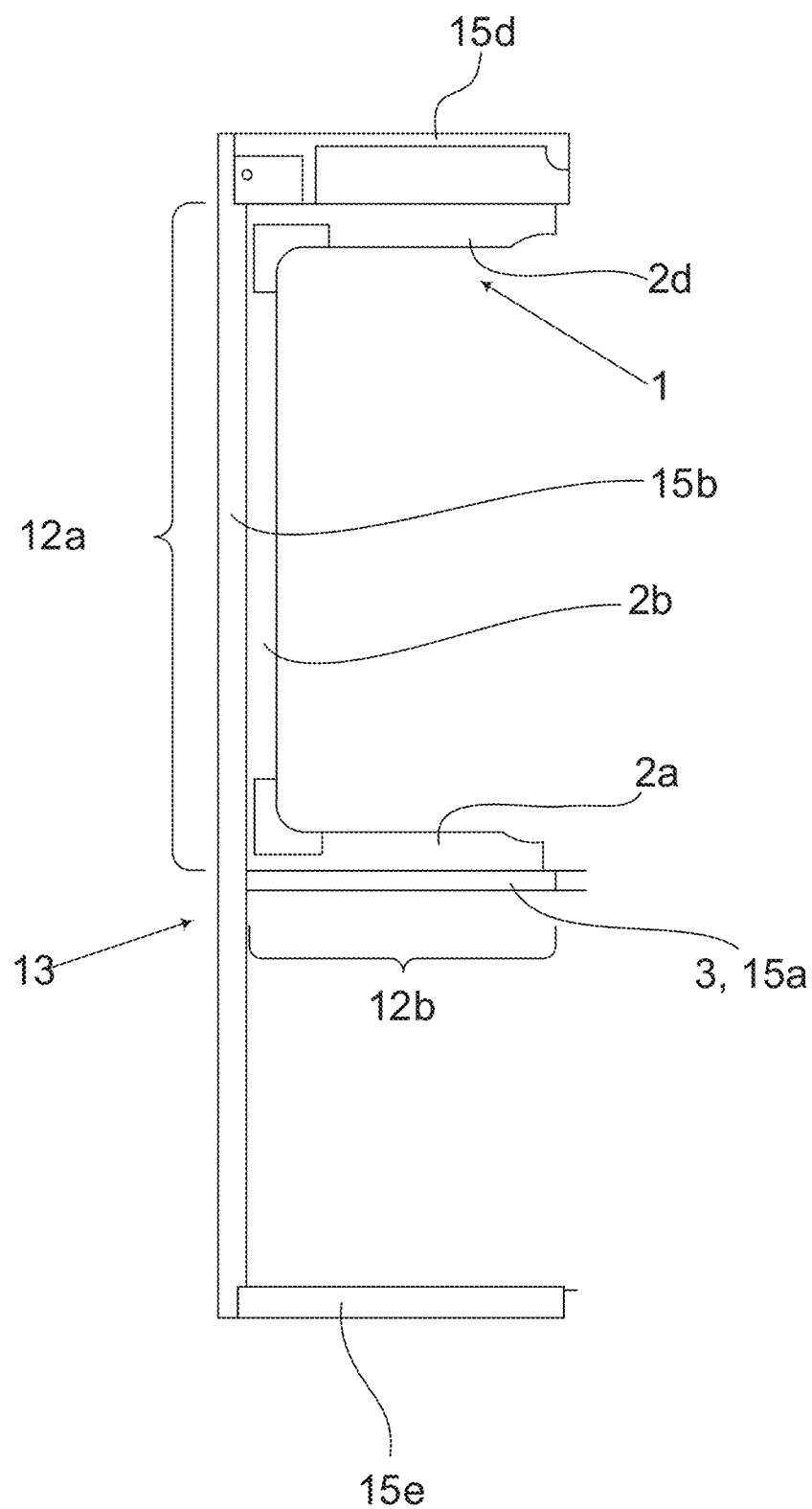
FIG. 1 shows an exemplary embodiment of a vehicle door according to the proposal in a partial top view, FIG. 2 a partial cross-sectional view of the vehicle door in FIG. 1, FIGS. 3a-3c a perspective view of the vehicle door in FIG. 1, and FIG. 4 another perspective view of the vehicle door in FIG. 1 with door plates.
Figure 3:
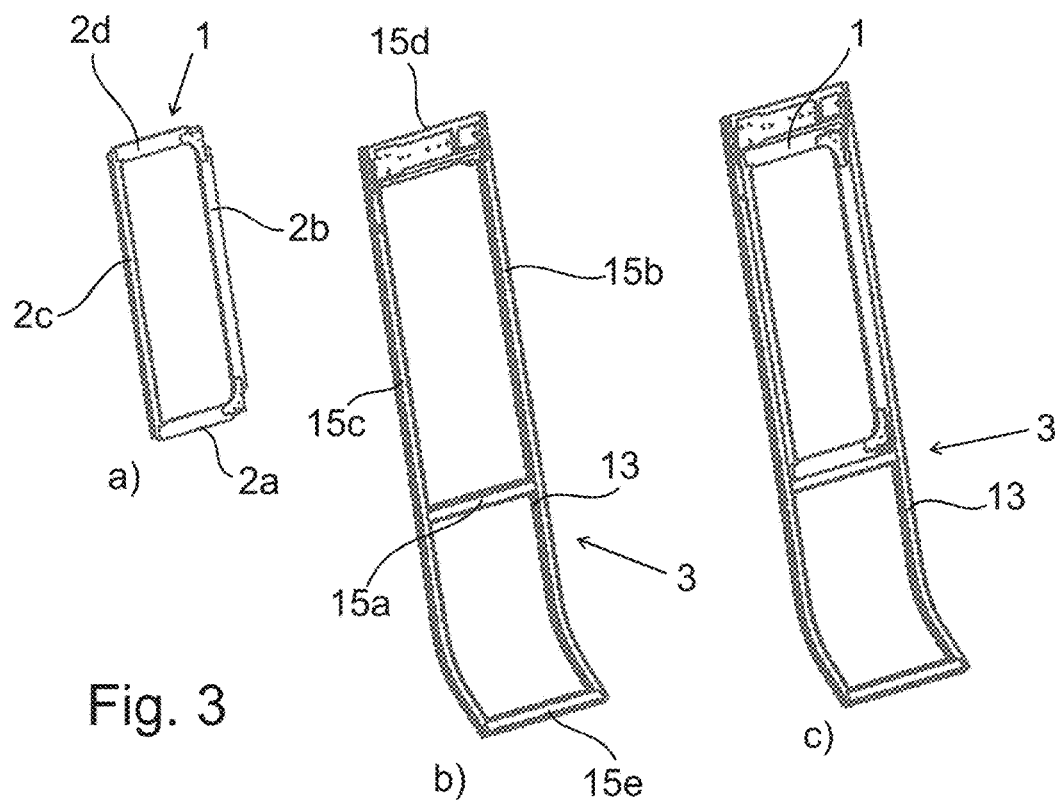

In the case of the vehicle door according to the proposal, which is partially shown in the exemplary embodiment in FIG. 1, it has to do with a passenger door for a public transport vehicle and, in particular, with a passenger door for an underground railway (also referred to as a metro or an underground). On the one hand, the window frame 1 for receiving a window can be recognized (not shown here). From this window frame, in FIG. 1, three window elements 2a,b,d for receiving a respective window edge of the window can be recognized. All four elements 2a-d of the window frame 1 are shown in FIG. 3 and, in particular, in FIG. 3a. On the other hand, in FIG. 1, the door frame 3 for receiving the window frame 1 is also partly shown.

Figure 2:
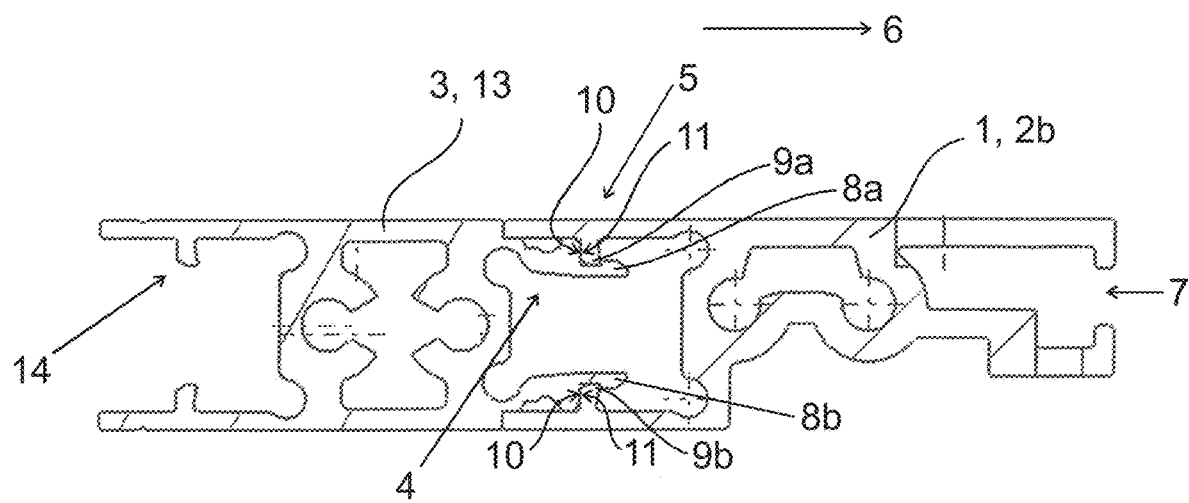

The door profile 4 of the door frame 3 as well as the window profile 5 of the frame element 2b can be recognized in the cross-sectional view in FIG. 2, in which the release direction 6 is also indicated. The release direction 6 is perpendicular to the window edge received by the window frame element 2b, wherein neither the window edge nor the corresponding window are shown in FIG. 2. However, the position of the window edge received by the window frame element 2b readily results from the shape and position of the window holder opening 7. The form-fitting engagement between the window profile 5 and the door profile 4, which forms a non-detachable snap connection, can be recognized in FIG. 2. A detachable movement of the window profile 5 in release direction 6 relative door profile 4 is hindered by the form-fitting engagement.

In the design profile shown, the three frame elements 2a-c comprise the window profile 5. Accordingly, in the exemplary embodiment, the door frame 3 also comprises the door profile three-fold, namely one for each frame element 2a-c for engaging with the window profile 5 of the respective frame element 2a-c. To this extent, the partial cross-sectional view in FIG. 2 with regard to the form-fitting engagement of the window profile 5 with the door profile 4 applies to the frame elements 2a-c and the corresponding sections of the door frame 3. In the present exemplary embodiment, the frame element 2d does not comprise a window profile 5 and is therefore connected to the corresponding section of the door frame 3 in another way. Here, it is not significant in what way. It would also be conceivable that the frame element 2d also comprises a window profile 5 and the corresponding section of the door frame 3 comprises a door profile 4.

In FIG. 2, it can also be recognized that the door profile 4 comprises snap hooks 8a, b springing toward each other, which grip behind projections 9a, b of the window profile 5. When gripping behind, the projections 9a, b spring away from each other. In the state of the established form-fitting engagement, both the snap hooks 8a, b as well as the projections 9a, b primarily, meaning to a great extent, but not completely, spring back to their respective rest position. The snap hooks 8a, b each have a contact surface 10, which abut a respective end-stop 11 of the projections 9a, b in the state shown of the established form-fitting engagement. However, since gripping behind occurs in an alternating manner, particularly in this exemplary embodiment, in principle, projections 9a, b can also be understood as such snap hooks and snap hooks 8a, b could be understood as projections.

From the overview in FIG. 1 with FIGS. 3a and 3b, it can be seen that the frame element 2a, its window profile 5 and the corresponding door profile 4 primarily extend across the entire edge length 12b of the window edge received by the frame element 2a, according to the shorter side of the rectangular-like window frame 1. The frame elements 2b, d, their respective window profiles 5 and their corresponding door profiles 4, in turn, primarily extend across the entire edge length 12a of the respectively received window edge, which corresponds to the longer side of the rectangular-like window frame 1.

In the case of the vehicle door of the exemplary embodiment, the three door profiles 4 of the door frame 3, corresponding to the frame elements 2a-c of the window frame 1, are designed as a single piece with the door frame body 13, meaning with the respective part of the door frame 3, which supports the window frame 1 on the vehicle. The door frame body 13 is shown as such in FIG. 3b. Principally, the door profiles 4 could also be attached to the door frame body 13 as separate components. Opposite to the door profiles 4, meaning pointing outwardly with reference to the window frame 1, the door frame body 13 comprises an outer profile 14 respectively, which corresponds to the window profile 5 in accordance with FIG. 2 and which is also designed as a single piece with the door frame body 13.

Overall, the door frame body 13 of the exemplary embodiment comprises four body elements 15a-d, as is shown in FIG. 3b, to close the window frame 1, wherein the three body elements 15a-c comprise the door profile 4 respectively designed with the body element as a single piece. The door frame body 13 also comprises another body element 15e, which, however, does not abut the window frame 1 and, here, is not of further significance.

The body elements 15a-d to close the window frame 1 lie at an angle of 90° to each other respectively on a single level, which is referred to as a frame level and which also corresponds to the window level, meaning the level, in which the window received by the window frame 1 also lies.

Respectively adjacent body elements 15a-d to close the window frame 1 are screwed to each other, wherein a weld or a glue connection would also be considered. The frame elements 2a-d are also arranged on this frame level, wherein respectively adjacent frame elements 2a-d form a 90° angle. Overall, both the door frame body 13 as well as the window frame 1 are made of an aluminium alloy.

In the case of a preferred manufacturing sequence for the vehicle door of the exemplary embodiment, initially and in accordance with the illustration in FIG. 3a, the frame elements 2a-d are connected to each other to form the window frame 1 for receiving the window, wherein, here, the frame elements 2a-d, for example, are connected among one another by connecting means, which are not described any further. Then, the window frame 1 is introduced into the door frame 3 subject to establishing the respective form-fitting engagements between the window profiles 5 and the door profiles 4. Thereby, the door frame 3 is regularly open on at least one side and preferably open on two sides. After introducing the window frame 1, the door frame 3 is closed so that the state shown in FIG. 3c occurs. FIG. 3b only shows the closed door frame 3 without the window frame 1 for the sake of clarification.

Figure 4:
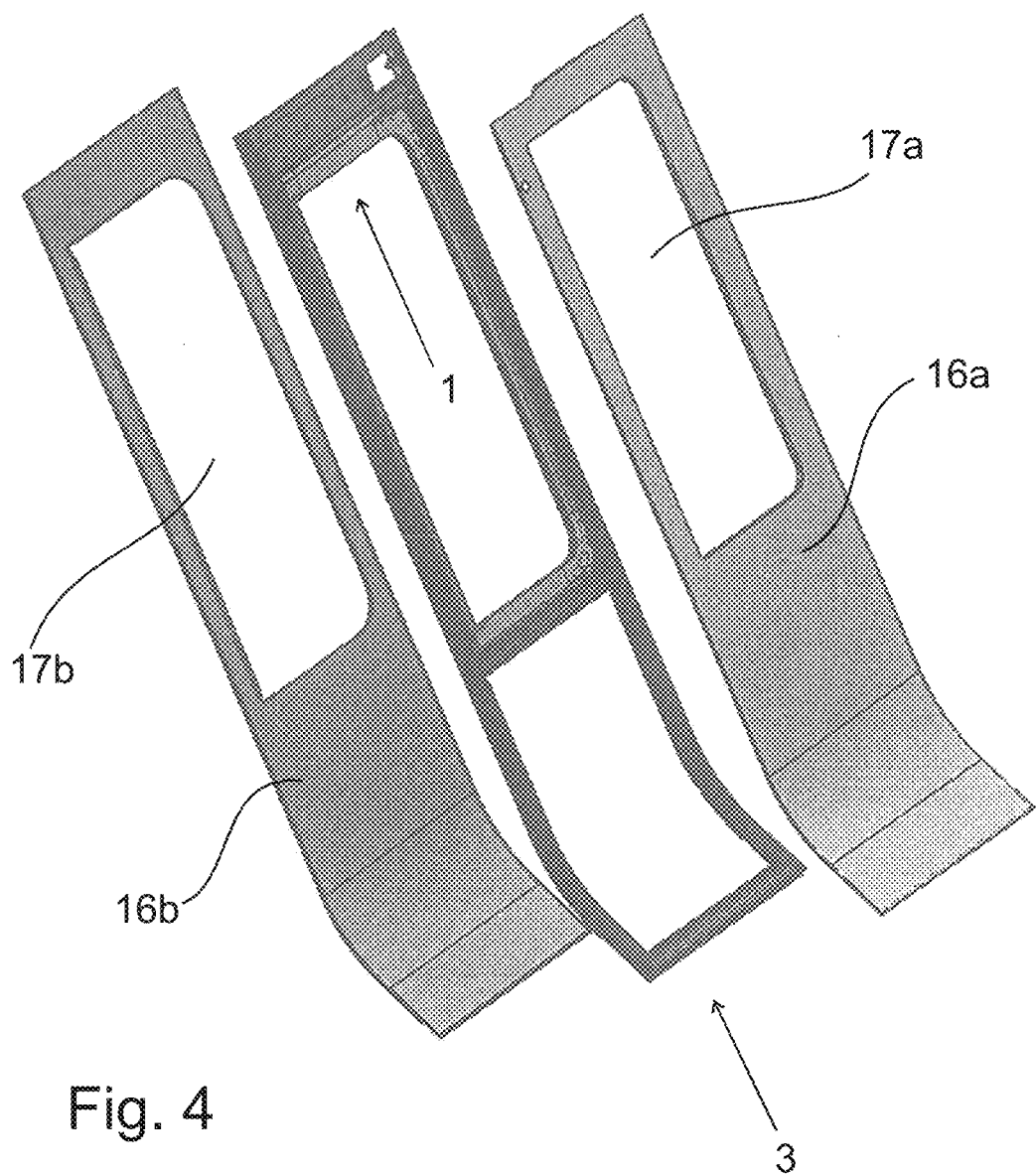

As a further method step, FIG. 4 shows the arrangement of door plates 16a, b. In particular, the vehicle door of the exemplary embodiment comprises two door plates 16a, b, which are attached to the door frame 3. Thereby, they completely cover the door frame 3 and the window frame 1, however release the window received by the window frame 1 to the furthest extent possible through their respective window opening 17a, b.

The invention claimed is:

1. A vehicle door with a window frame for receiving a window, wherein the window frame comprises at least one frame element for receiving a respective lateral edge surface of the window, and with a door frame for receiving the window frame, wherein the door frame comprises at least one door profile and wherein the at least one frame element comprises a window profile respectively, wherein the at least one window profile with reference to a movement in a release direction perpendicular to the lateral edge received by the respective at least one frame element is engaged with a respective door profile in a form-fitting manner, wherein the form-fitting engagement between the at least one window profile and the respective door profile forms a snap connection, wherein the at least one door profile comprises snap hooks that spring toward one another to grip behind projections of the respective window profile when establishing the form-fitting engagement or that the at least one window profile comprises snap hooks that spring toward each other to grip behind projections of the respective door profile when establishing the form-fitting engagement, wherein the vehicle door comprises at least one door plate to fasten to the door frame so that the at least one door plate fastened to the door frame completely covers the door frame and the window frame and, a respective window opening of the at least one door plate leaves a window received by the window frame uncovered.

2. The vehicle door according to claim 1, wherein the projections of the at least one window profile are set up for deflection springing away from each other when gripping behind these projections by the respective snap hooks or that the projections of the at least one door profile are set up for deflection springing away from each other when gripping behind these projections by the respective snap hooks.

3. The vehicle door according to claim 2, wherein the projections and the snap hooks spring back in a rest position after establishing the form-fitting engagement.

4. The vehicle door according to claim 1, wherein the snap hooks each comprise a contact surface, which points in the release direction (6), and the projections each comprise an end-stop that is primarily coplanar to the contact surface so that the contact surface abuts the respective end-stop by means of the engagement between the window profile and the door profile.

5. The vehicle door according to claim 1, wherein the at least one frame element primarily extends across an entire edge length of the respectively received window edge, that the window profile of the at least one frame element extends across one half of the edge length of the respectively received window edge.

6. The vehicle door according to claim 1, wherein the at least one door profile extends across one half of the edge length of the very window edge which is received by the respective frame element, the window profile of which is engaged with the at least one door profile.

7. The vehicle door according to claim 1, wherein the door frame comprises a frame body to support the window frame on the vehicle and the frame body is designed as a single piece with a respective said at least one door profile, that the frame body comprises an outer profile that is designed as a single piece with the frame body, which is arranged opposite to the door profile and corresponds to the window profile.

8. The vehicle door according to claim 7, wherein the frame body comprises three body elements with a door profile respectively, which is configured as a single piece with the body element to close the window frame on three sides.

9. The vehicle door according to claim 8, wherein the body elements are each designed separately and adjacent body elements are connected to one another by separate fastening means and/or by a separate adhesive bond.

10. The vehicle door according to claim 1, wherein the window frame comprises at least three frame elements so that at least three window edges of the window are received by a frame element respectively, such that the frame elements are primarily arranged at a frame level and that adjacent frame elements are arranged at an angle of primarily 90° to one another.

11. The vehicle door according to claim 10, wherein the at least three frame elements and/or the door frame, are primarily made of metal.

* * * * *